(12) United States Patent
Adragna, Jr. et al.

(10) Patent No.: US 7,966,973 B1
(45) Date of Patent: Jun. 28, 2011

(54) SUSPENSION CONTAINER FOR INCUBATING REPTILE EGGS

(76) Inventors: John Adragna, Jr., Staten Island, NY (US); Gregg Madden, Staten Island, NY (US)

( * ) Notice: Subject to any disclaimer, the term of this patent is extended or adjusted under 35 U.S.C. 154(b) by 273 days.

(21) Appl. No.: 12/383,547

(22) Filed: Mar. 25, 2009

(51) Int. Cl.
*A01K 41/00* (2006.01)
*A01K 67/00* (2006.01)

(52) U.S. Cl. .................................... 119/311; 119/328

(58) Field of Classification Search .......... 119/310–312, 119/320, 322, 328, 303, 302, 218, 318, 319; 237/14, 15
See application file for complete search history.

(56) References Cited

U.S. PATENT DOCUMENTS

| | | | |
|---|---|---|---|
| 324,274 A * | 8/1885 | Rosebrook | 119/322 |
| 702,780 A | 6/1902 | Darling | |
| 1,289,510 A * | 12/1918 | Miller | 338/254 |
| 2,074,190 A | 3/1937 | Robbins | 119/43 |
| 3,489,124 A | 1/1970 | Cannon | 119/43 |
| 5,146,871 A | 9/1992 | Havran | 119/43 |
| 5,568,791 A | 10/1996 | Dratt | 119/300 |
| 6,196,159 B1 | 3/2001 | Dratt | 119/300 |
| 6,196,160 B1 | 3/2001 | Pas | 119/322 |
| 6,431,460 B1 * | 8/2002 | Lo | 237/15 |
| 7,261,860 B1 | 8/2007 | Vellinger | 422/72 |

\* cited by examiner

*Primary Examiner* — Rob Swiatek
*Assistant Examiner* — Kristen C Hayes
(74) *Attorney, Agent, or Firm* — Goldstein Law Offices, P.C.

(57) ABSTRACT

An incubation container, for stabilizing reptile eggs during incubation, having a main part and a lid. The main part has side walls, a bottom, and an open top which together define an interior volume, and a lid for selectively closing the open top and making the interior volume air-tight. A ledge extending around the side walls substantially parallel to the bottom and supports a support surface having a plurality of openings arranged in a grid. Reptile eggs rest upon the support surface during incubation. Stabilizing rods are secured to the support surface to hold the eggs in a consistent position using plugs which extend downwardly from a lower surface of the rods. Moisture absorbing material is located on the bottom of the container to maintain humidity during incubation.

6 Claims, 2 Drawing Sheets

SUSPENSION CONTAINER FOR INCUBATING REPTILE EGGS

BACKGROUND OF THE INVENTION

The invention relates to a suspension container for incubating reptile eggs. More particularly, the invention relates to a container which holds a plurality of reptile eggs, and helps maintain environmental moisture levels during incubation.

For many years, man has sought to carry out part of nature's reproductive processes by incubating the eggs of various creatures. Most typically it is aviary creatures that have been incubated, especially where they bear relevance to farming and food production systems. Significant discoveries and developments have lead to vastly improved systems for aviary egg incubation.

Reptile incubation has also become increasingly popular, in both scientific and hobbyist settings. As reptiles become more popular as pets, many hobbyists seeks to breed reptiles in captivity from their own breeding pairs. Other hobbyists recover and incubate eggs that are laid by wild reptiles in natural settings.

As artificial incubation of reptile eggs has become even more common, it has become clear that systems and rules commonly applied to aviary incubation do not necessarily result in successful reptile incubation. For example, it is a common practice to rotate bird eggs during incubation. Rotating an incubating reptile egg after it has set (within 3-4 days of being laid), however, will likely kill the developing reptile.

In general it must be considered that the natural environment for incubating reptiles is very different than incubating birds. Bird eggs generally incubate in the dry open air that is found up high in trees. Reptile eggs, however, generally incubate in deep underground boroughs, in cooler but not cold, moist but not wet environments.

Accordingly, while much of the prior art is concerned with care of aviary eggs, this does not adequately inform proper systems and techniques necessary for the care of reptile eggs. For example, U.S. Pat. No. 6,196,160 to Pas discloses an egg incubating tray which is configured for incubating a massive number of chicks. Similarly, U.S. Pat. Nos. 6,196,159 and 5,568,791 to Dratt disclose systems for incubating poultry eggs. U.S. Pat. No. 5,146,871 to Havran discloses an incubator and hatcher tray which is tilted and inverted during incubation. U.S. Pat. No. 3,489,124 to Cannon discloses an incubator egg tray that is designed for air circulation and for rotating the eggs during incubation. U.S. Pat. No. 2,074,190 to Robbins describes an incubator that is configured to avoid the spread of disease through the development of germs on egg-particles from already hatched chicks. U.S. Pat. No. 702,780 to Darling discloses an egg tray that has an open bottom, and uses partitions to ensure that an accurate record is kept of each particular hen and of the egg producing it.

While these units may be suitable for the particular purpose employed, or for general use, they would not be as suitable for the purposes of the present invention as disclosed hereafter.

SUMMARY OF THE INVENTION

It is an object of the invention to produce an incubation container suitable for incubating reptile eggs. Accordingly, the incubation container suspends the reptile eggs on an egg supporting surface, and stabilizes the eggs thereon to prevent movement that could potentially harm developing reptiles therein.

It is another object of the invention to provide an incubation container that maintains suitable moisture levels ongoingly during egg incubation. Accordingly, a moisture absorbing medium is provided within the container below the egg supporting surface.

It is another object of the invention to adjust to eggs of different sizes, while ensuring that the eggs are securely stabilized upon the egg supporting surface. Accordingly, partition rods are provided which have periodically spaced studs which fit within a plurality of openings within the egg supporting surface, to allow the position of the partition rods to be varied and secured in place at any desired location.

The invention is an incubation container, for stabilizing reptile eggs during incubation, having a main part and a lid. The main part has side walls, a bottom, and an open top which together define an interior volume, and a lid for selectively closing the open top and making the interior volume air-tight. A ledge extending around the side walls substantially parallel to the bottom and supports a support surface having a plurality of openings arranged in a grid. Reptile eggs rest upon the support surface during incubation. Stabilizing rods are secured to the support surface to hold the eggs in a consistent position using plugs which extend downwardly from a lower surface of the rods. Moisture absorbing material is located on the bottom of the container to maintain humidity during incubation.

To the accomplishment of the above and related objects the invention may be embodied in the form illustrated in the accompanying drawings. Attention is called to the fact, however, that the drawings are illustrative only. Variations are contemplated as being part of the invention, limited only by, the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
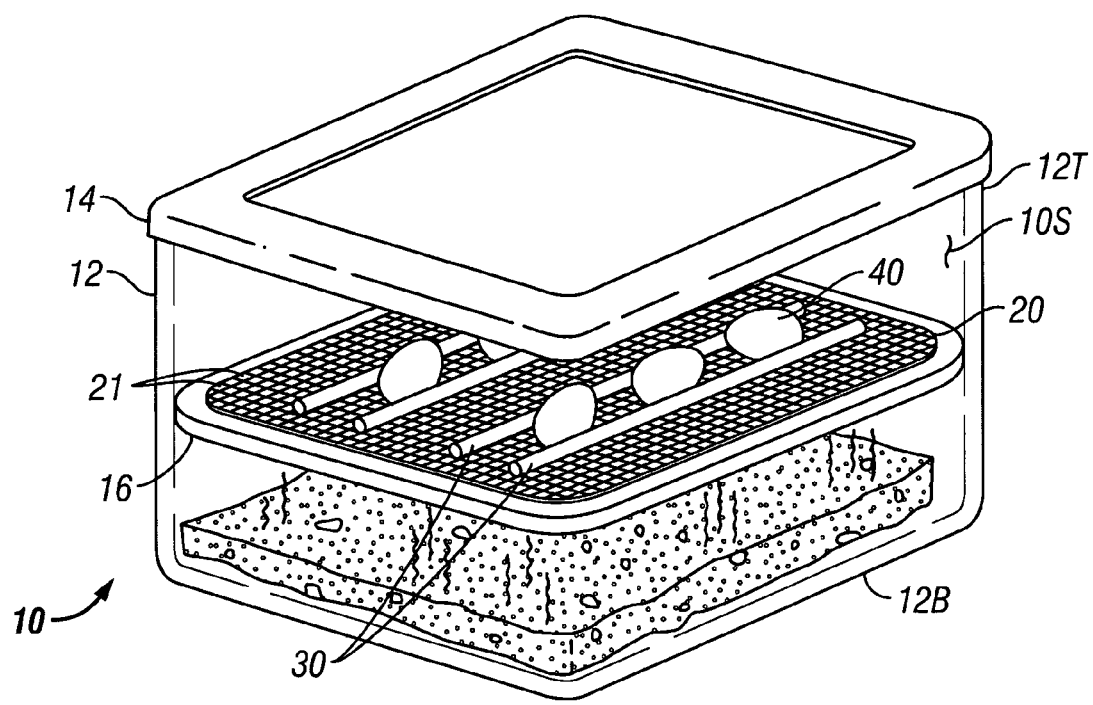
FIG. 1 is a diagrammatic perspective view, illustrating the incubation container, per se, wherein eggs are being incubated upon an egg supporting surface, and are held in place with partition rods, and a spongey medium is provided on the bottom of the container to maintain moisture within the container.
Figure 3:
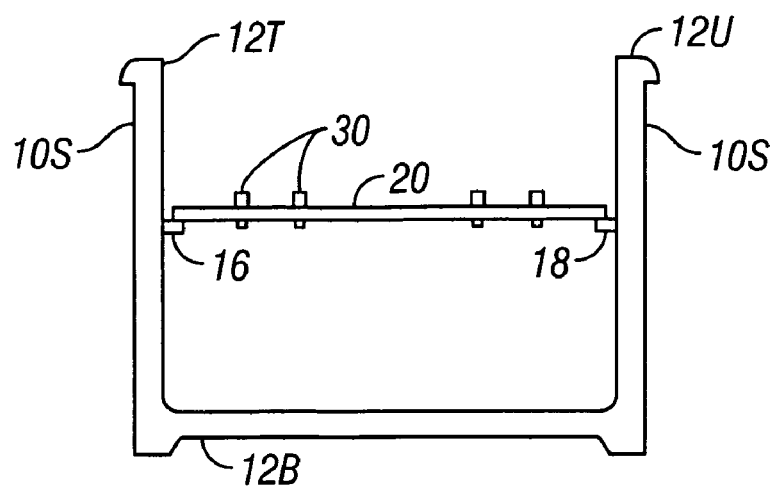
FIG. 3 is a side elevational view, with parts broken away, illustrating internal details of the container.

FIG. 1 illustrates an incubation container 10. The container is substantially rectangular prism shaped, having four orthogonal side walls 10S. The container 10 has a main part 12 which defines an interior volume, and a lid 14. The main part has a bottom 12B, and (referring momentarily to FIG. 3) a top 12T having an upper lip 12U. The main part 12 is substantially open at the top 12T. The lid 14 is selectively attachable to the main part 12, and is adapted to seal to the main part the make the interior volume substantially air-tight. An overall size for the main part, suitable for incubating several reptile eggs and fitting conveniently within commercially available incubators, is substantially 100-150 millimeters in with, substantially 150-200 millimeters in length, and substantially 100-125 millimeters in height.

Figure 5:
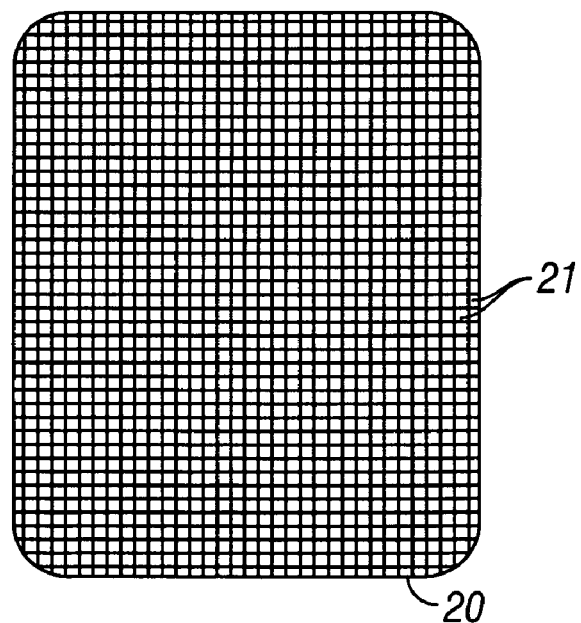
FIG. 5 is a top plan view, illustrating just the support surface, per se.

Located within the main part 12, extending inwardly from the side walls is a supporting ledge 16. The supporting ledge 16 extends substantially parallel to the bottom 12B. The supporting ledge has a central opening 18. A support surface 20 extends substantially between the side walls 10S, substantially parallel to the bottom 12B, and rests upon the supporting ledge 16. The support surface 20 is rigid and porous, having a plurality of opening 21 arranged in a grid. These openings are preferably 2-3 millimeters square. Accordingly, referring to FIG. 5, the support surface 20 may be made of a substantially rigid mesh material. The mesh material provides gaseous communication between the interior volume above and below the support surface 20. The support surface 20 is substantially rectangular in shape, sized to fit within the sides 10S, and is slightly larger than the central opening 18 formed by the supporting ledge 16. The support surface 20 may be made of a variety of materials, including natural fibers, nylon, plastic, and metal mesh materials, and such is selected to support the weight of several reptile eggs with minimal deflection.

Figure 4:
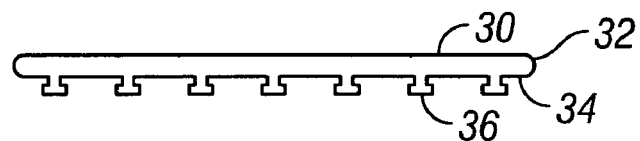
FIG. 4 is a side elevational view of one of the rods, per se.

A plurality of stabilizing rods 30 are configured to secure to the support surface 20, and maintain their position thereupon. Accordingly, referring to FIG. 4, the stabilizing rods include an elongated bar 32, having a bottom 34, and a plurality of plugs 36 extending downwardly from the bottom, and periodically spaced thereon. The plugs 36 are sized to fit snugly within the openings 21 of the support surface 20, so as to allow the stabilizing rods 30 to be secured to the support surface 20.

Referring again to FIG. 1, a plurality of reptile eggs 40 are positioned upon the support surface 20. The eggs 40 are held in place by the stabilizing rods 30, which are secured to the support surface 20 in pairs, such that they stabilize the eggs 40 and prevent them from moving while they are incubating. Accordingly, at least two stabilizing rods 30 are employed during any incubation. Note that the stabilizing rods 30 are easily repositionable, and should be appropriately adjusted when different sized eggs are being incubated.

Further in accordance with the principles of the present invention, a moisture absorbing material 50 is located within interior volume of the container 10, below the support surface 20. In particular, in the embodiment illustrated in FIG. 1, the moisture absorbing material 50 is a sponge that is positioned upon the bottom 10B of the container 10 and is sized to fit thereupon. The moisture absorbing material 50 helps maintain moisture levels within the container 10, by entropically evaporating moisture when humidity levels become low and thereby automatically achieving an equilibrium humidity level within the container 10.

Figure 2:
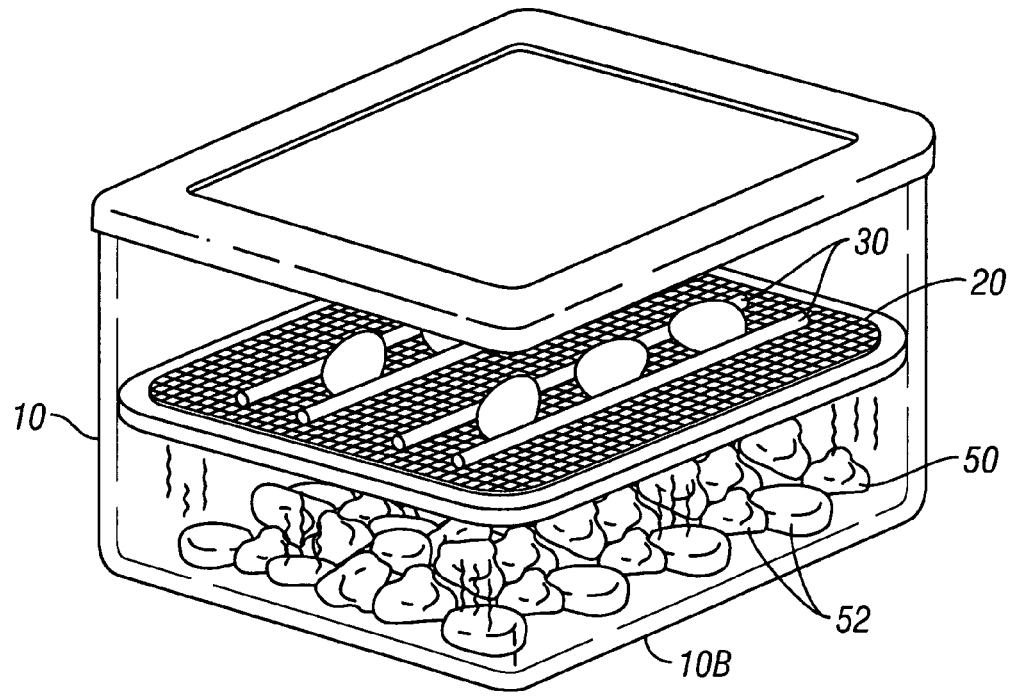
FIG. 2 is a diagrammatic perspective view, similar to FIG. 1, except wherein discrete, rock-like moisture absorbing elements are present on the bottom of the container.

A further embodiment of the invention is indicated in FIG. 2, wherein the moisture absorbing material 50 is made up of discrete, stone or gravel like elements 52, such as the minerals perlite or vermiculite. Such minerals are chosen due to the desired moisture absorbing properties—noting that vermiculite generally absorbs more moisture than perlite. The bottom 10B is substantially covered with the stone or gravel like elements 52, which communicate moisture with the interior volume of the container 10 to maintain desired humidity levels.

The container 10 may be additionally modified to add ventilation to an otherwise airtight container. In particular, ventilation holes may be added to the lid 14 if it is desired to have an exchange of gases. In the absence of such added ventilation holes, the container will effectively maintain gaseous and moisture integrity within the interior volume.

In conclusion, herein is presented an incubation container that effectively stabilizes reptile eggs and maintains consistent humidity levels to ensure successful incubation. The invention is illustrated by example in the drawing figures, and throughout the written description. It should be understood that numerous variations are possible, while adhering to the inventive concept. Such variations are contemplated as being a part of the present invention.

What is claimed is:

1. An incubation container, for use within an incubator, to incubate reptile eggs, comprising:
   a main part having side walls, a bottom, and a top that together define an interior volume, the main part is open at the top, the main part having a support ledge extending substantially midway between the bottom and top;
   a lid, the lid selectively mates with the top to make the interior volume substantially air-tight;
   a support surface, the support surface is supported by the support ledge, the support surface is a meshed grid having a plurality of periodically spaced openings;
   at least two stabilizing rods, the stabilizing rods each having a bottom surface and a plurality of plugs extending downwardly from the bottom surface, the plugs are sized to fit within the openings in the support surface to fix the stabilizing rod in position thereupon, the at least two stabilizing rods are arranged parallel to each other to hold the reptile eggs in the same position so that they do not move while they are being incubated; and
   a moisture absorbing material, located beneath the support ledge, for holding and releasing moisture to maintain humidity levels within the container during incubation.

2. An incubation container, for use within an incubator, to incubate reptile eggs, comprising:
   a main part having side walls, a bottom, and a top that together define an interior volume, the main part is open at the top, the main part having a support ledge extending substantially midway between the bottom and top;
   a lid, the lid selectively mates with the top to make the interior volume substantially air-tight;
   a support surface, the support surface is supported by the support ledge, the support surface having a plurality of periodically spaced openings; and
   at least two stabilizing rods, the stabilizing rods each having a bottom surface and a plurality of plugs extending downwardly from the bottom surface, the plugs are sized to fit within the openings in the support surface to fix the stabilizing rod in position thereupon, the at least two stabilizing rods are arranged parallel to each other to hold the reptile eggs in the same position so that they do not move while they are being incubated.

3. The incubation container as recited in claim 2, further comprising a moisture absorbing material, located beneath the support ledge, for holding and releasing moisture to maintain humidity levels within the container during incubation.

4. The incubation container as recited in claim 3, wherein the support surface is a meshed grid having the openings.

5. The incubation container as recited in claim 4, wherein the moisture absorbing material is selected from the group consisting of a sponge, vermiculite and perlite.

6. An incubation container, for use within an incubator, to incubate reptile eggs, comprising:
   a main part having side walls, a bottom, and a top that together define an interior volume, the main part is open at the top;
   a lid, the lid selectively mates with the top to make the interior volume substantially air-tight;
   a support surface, the support surface is supported by the main part, the support surface having a plurality of periodically spaced openings;

a moisture absorbing material, located beneath the main part, for holding and releasing moisture to maintain humidity levels within the container during incubation; and at least two stabilizing rods, the stabilizing rods each having a bottom surface and a plurality of plugs extending downwardly from the bottom surface, the plugs are sized to fit within the openings in the support surface to fix the stabilizing rod in position thereupon, the at least two stabilizing rods are arranged parallel to each other to hold the reptile eggs in the same position so that they do not move while they are being incubated.

\* \* \* \* \*